INVENTOR.
LEONARD J. BAUN
BY Eugene M. Whitacre
Attorney

INVENTOR.
LEONARD J. BAUN
BY Eugene M. Whitacre
Attorney

United States Patent Office 3,423,525

Patented Jan. 21, 1969

3,423,525

LINE-SELECT APPARATUS FOR A TELEVISION WAVEFORM MONITOR

Leonard J. Baun, Cinnaminson, N.J., assignor to Radio Corporation of America, a corporation of Delaware Filed Apr. 2, 1965, Ser. No. 444,993

U.S. Cl. 178—7.3 11 Claims

Int. Cl. H04n 3/16, 5/38

ABSTRACT OF THE DISCLOSURE

Line select apparatus for a television waveform monitor including a gating arrangement and an output bistable multivibrator. Only two consecutive pulses of a periodic train of pulses supplied to the gating arrangement at the line scanning rate will ever reach the multivibrator before the arrangement is disabled. Which two pulses they will be is determined by a manually controlled delay provided to an enabling signal for the arrangement. The pulse signal developed by the multivibrator is used to adjust the time-base system of the waveform monitor and can be used to intensify the selected line on a picture monitor.

Figure 1:
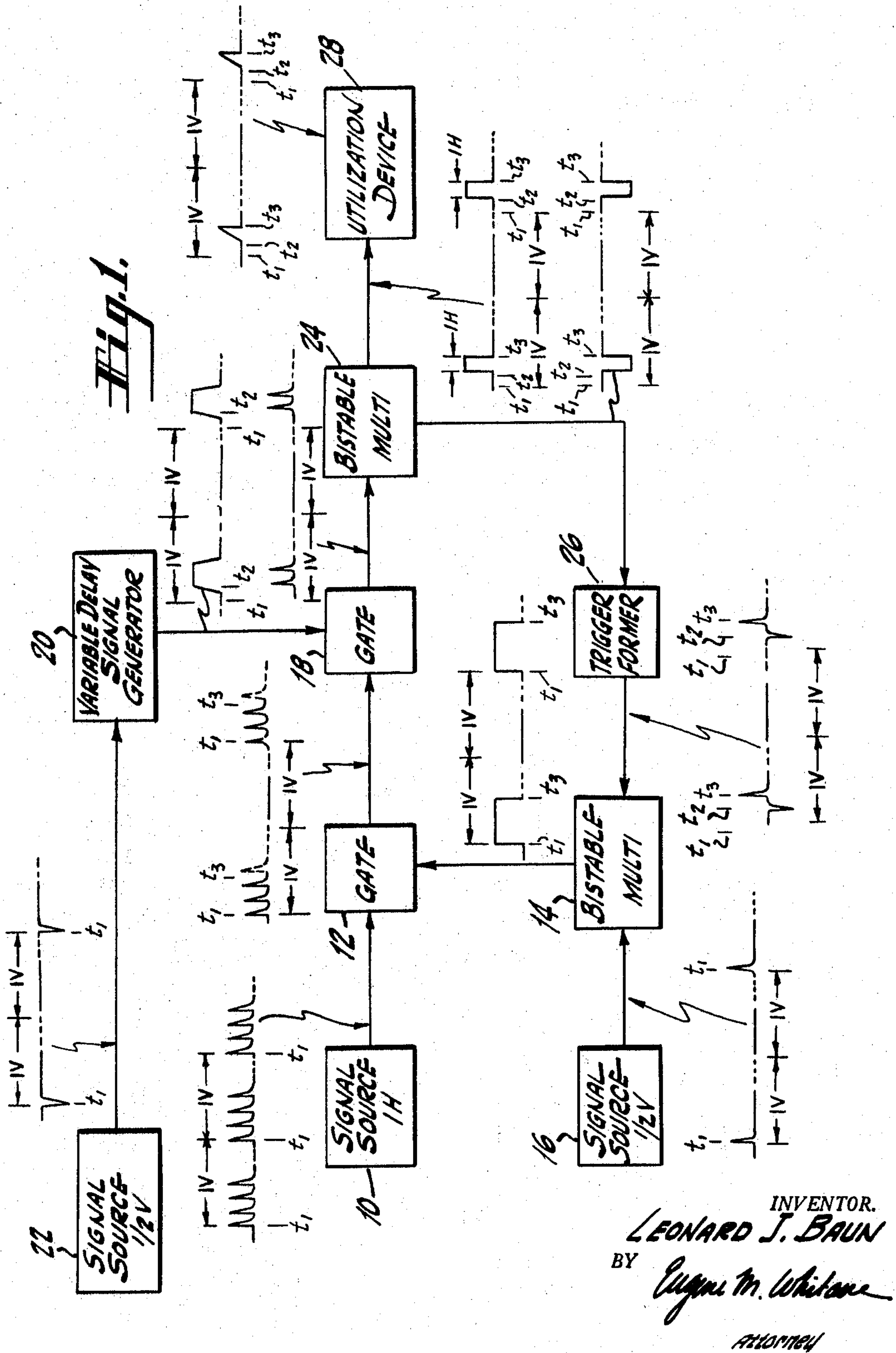

This invention relates to television waveform monitors and, more particularly, to line-select apparatus used therein. As is well known and understood in the television broadcasting field, such apparatus can be used to analyze the sharpness, the response, and the resolution of individual lines of television picture information generated within a television camera. By analyzing many such lines, an indication can be had of the overall operating performance of a television camera chain.

Various line-select arrangements are known and used in the prior art. By and large each operates to develop a pulse which is one horizontal scanning line length in duration at a time corresponding to the position in the interlaced television field at which the selected picture information line appears. That pulse is then used to sweep the beam in the monitor oscilloscope to display the selected line. It may also be used to intensify the selected line on a picture or kinescope monitor.

The most common arrangement heretofore known uses a multivibrator chain as a delay device in selecting the picture information line which it is desired to investigate. Each stage of multivibrator delay, however, is characteristically accompanied by a certain amount of "jitter" and instability. The total amount introduced when many stages of delay are required, as for example, when the selected line is close to the bottom of the interlaced field, may very well cause the picture information line actually displayed to be different from the information line desired to be displayed. For this reason, the multivibrator arrangements are usually limited to selecting only those lines that appear in the top three-quarters of the interlaced field.

Another disadvantage of the multivibrator delay arrangements results from the relatively slow response time of the multivibrator stage. In certain message systems, it may be desired to transmit signal information during the equalizing pulse interval following the vertical synchronizing pulse interval of the video signal, i.e., at the top of the interlaced field. The inability of the multivibrator stages to switch states fast enough to impart the small but necessary delay makes it virtually impossible to investigate this signal information on the waveform monitor.

It is an object of the present invention, therefore, to provide an improved line-select apparatus for a television waveform monitor which does not suffer from the disadvantages and limitations of the prior art apparatus outlined above.

In accordance with the invention, line-select apparatus for a television waveform monitor includes an output bistable multivibrator. The apparatus also includes first and second series connected gating means for supplying triggers to the multivibrator at the television line scanning rate. The line-select apparatus additionally includes a control bistable multivibrator for enabling the first gating means at a time $t_1$ in response to a first periodic train of triggers supplied at one half the television field scanning rate and, also, a variable delay signal generator for enabling the second gating means at a later time $t_2$ in response to a second such periodic train of triggers. The apparatus further includes means, including the control multivibrator, for disabling the first gating means at a still later time $t_3$ after two successive line scanning rate triggers cause the output multivibrator to develop a single output pulse. The apparatus finally includes means for coupling the output pulse to the sweep deflection circuits of the waveform monitor to adjust the time-base system thereof to cause the monitor to display the particular line of television picture information determined by the timing of the leading edge of the output pulse with respect to the one-half field scanning rate trigger enabling the first gating means.

Figure 2:
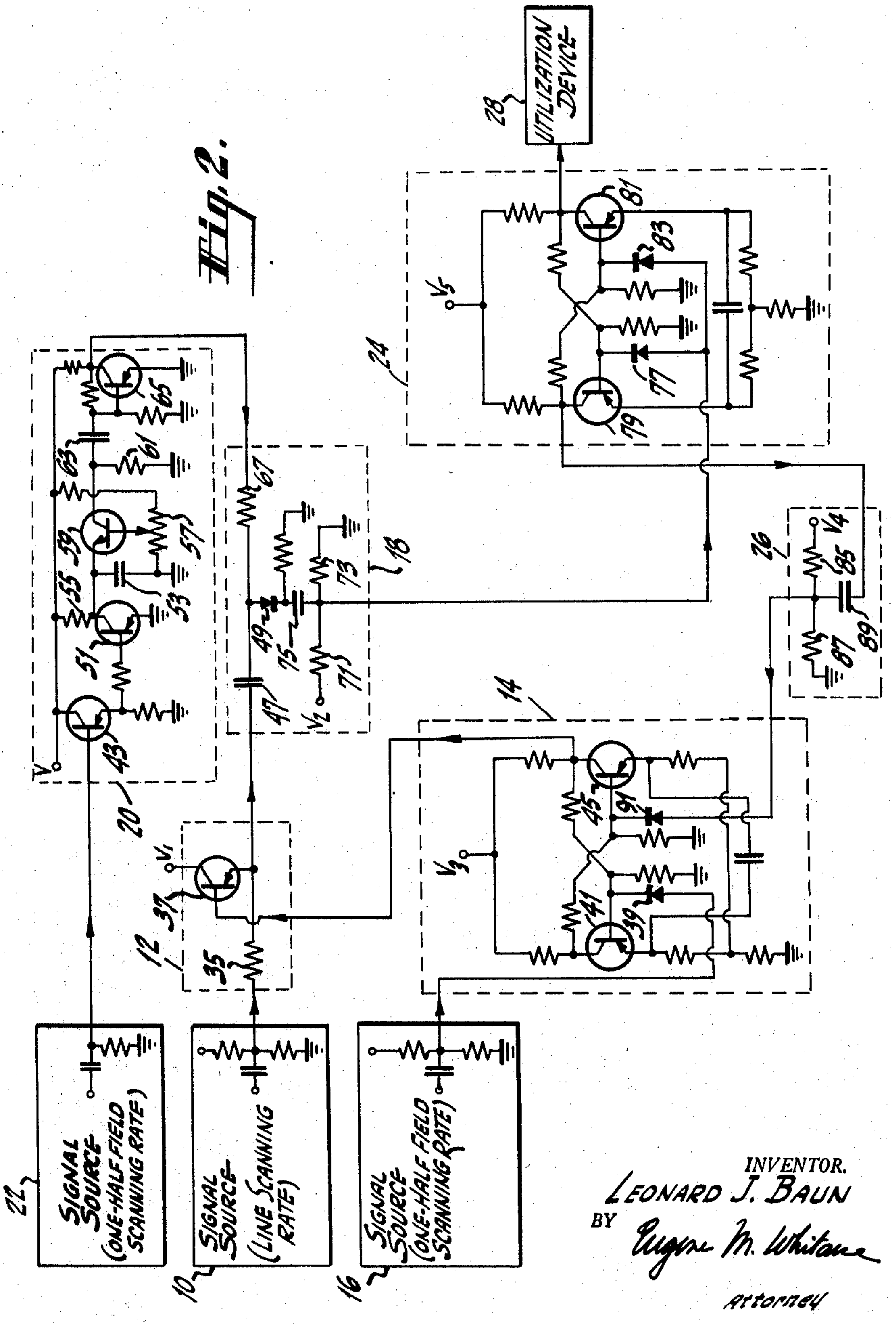

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1 is a block and line diagram of line-select apparatus for a television waveform monitor constructed in accordance with the principles of the present invention; and FIGURE 2 is a schematic diagram of such line-select apparatus.

Referring to the drawings and, more particularly, to FIG. 1, there is shown a block and line diagram illustrating the invention. In FIG. 1, a signal source 10 supplies a train of trigger pulses at the television line scanning or horizontal synchronizing rate. The output of source 10 is coupled through gate circuits 12 and 18, when enabled, to a bistable multivibrator 24. Gates 12 and 18 are respectively controlled by bistable multivibrator 14 and variable delay signal generator 20. In particular, multivibrator 14 enables gate 12 at a time $t_1$ in response to a train of trigger pulses supplied from a signal source 16 at one-half the television field scanning or vertical synchronizing rate. Signal generator 20 similarly enables gate 18 in response to a train of trigger pulses supplied from a signal source 22 at one-half the television field scanning or vertical synchronizing rate, but at a later time $t_2$.

The first pulse signal developed by multivibrator 24 in response to the coupled through horizontal synchronizing rate triggers is coupled to a trigger former 26 which generates a trigger signal from the trailing edge of the pulse. This trigger signal is then coupled to multivibrator 14 to cause multivibrator 14 to disable gate 12, at a still later time $t_3$. This action is carried out with such speed that only two horizontal synchronizing rate triggers are coupled through gates 12 and 18 to multivibrator 24 before gate 12 is disabled. A single output pulse, one horizontal scanning line length in duration, is therefore developed by multivibrator 24. This pulse is, as shown, coupled to a utilization device 28 which may represent the sweep deflection circuits of the television waveform monitor. As such, the pulse will adjust the time-base system of the waveform monitor so that only one line of television picture information will be displayed. The particular line displayed will depend upon which two horizontal synchronizing rate triggers generate the output pulse. This, in turn, will depend upon the delay provided by signal generator 20 to the enabling signal for gate 18.

Referring now to FIG. 2, it will be understood that the units of the apparatus there shown corresponding to the units illustrated in FIG. 1 are designated by similar reference numbers. Positive horizontal synchronizing rate triggers from source 10 are supplied to gate 12 and, more particularly, via a resistor 35 to the emitter electrode of a PNP transistor 37. Positive one-half vertical synchronizing rate triggers from source 16 are supplied to multivibrator 14 and, more particularly, via diode 39 to the base electrode of PNP transistor 41. Negative one-half vertical synchronizing rate triggers from source 22 are supplied to variable delay signal generator 20 and, more particularly, to the base electrode of a PNP transistor 43. Signal source 10 may include the horizontal synchronizing amplifier of the television waveform monitor or any other source of horizontal synchronizing information. Signal sources 16 and 22 may each include a one-half frequency divider circuit coupled to the output of the vertical synchronizing amplifier of the monitor or to the output of any other source of vertical synchronizing information. Each one-half vertical synchronizing rate trigger supplied, either by source 16 or 22, is time coincident with the start of one of the two interlaced fields of television picture information generated within the television camera and with the first horizontal synchronizing rate trigger supplied during that field interval.

Considering the operation during one such interval, the positive trigger supplied by signal source 16 to multivibrator 14 at the start of the interval, i.e., at time $t_1$, turns off transistor 41 and turns on transistor 45. The resulting positive voltage step at the collector electrode of transistor 45 is coupled to the base electrode of transistor 37 in gate 12 to turn off transistor 37. Due to the high impedance looking into its emitter circuit at this time, transistor 37 will have no effect on the passage of the horizontal synchronizing rate triggers supplied by signal source 10. These positive triggers pass right through gate 12, then, to gate 18 and, more particularly, via a capacitor 47 to the anode electrode of a diode 49 included therein.

The negative trigger supplied by signal source 22 to signal generator 20 at this same time $t_1$ turns on transistor 43. The resulting negative trigger at the emitter electrode of transistor 43 is coupled to the base electrode of transistor 51 and drives transistor 51 into saturation, thereby discharging capacitor 53. After termination of the negative input trigger, both transistors 43 and 51 are cut off. Capacitor 53 begins then to charge through resistor 55 towards voltage V (minus). When the voltage across capacitor 53 equals the voltage at the movable tap of potentiometer 57, transistor 59 begins to conduct. Capacitor 53 then charges through the low emitter impedance of transistor 59 bringing transistor 59 into its "full-on" condition. The resulting negative voltage step at the collector electrode of transistor 59 is differentiated by resistor 61, capacitor 63, and by the input impedance to the base circuit of transistor 65 to form a negative pulse whose duration is approximately equal to the total "turn on" time of transistor 59. This pulse is of sufficient amplitude to drive transistor 65 into saturation. It therefore causes transistor 65 to develop a positive pulse at its collector electrode which extends substantially to zero potential. This pulse is then coupled to gate 18 and, more particularly, via a resistor 67 to the anode electrode of diode 49.

In gate 18, until the positive pulse from transistor 65 reaches zero volts, diode 49 is reverse biased. No horizontal synchronizing rate triggers from gate 12 will then be passed. When the positive pulse reaches zero volts diode 49 is forward biased. All triggers from gate 12 will then be passed, through capacitor 47, diode 49, and the differentiating circuit comprising resistors 71 and 73 and capacitor 75. That time at which the positive pulse from transistor 65 reaches zero volts is the heretofore referred enabling time $t_2$. When the positive pulse returns to a negative voltage, diode 49 is reverse biased once again. Any further passage of positive triggers from gate 12 is thereby prevented. The duration of the positive pulse is sufficiently long to permit passage of at least two horizontal synchronizing triggers from gate 12 through gate 18 to multivibrator 24. As will now be described, however, no more than two successive triggers can ever be passed.

The first positive trigger coupled through gate 18 is coupled to multivibrator 24 and, more particularly, via diode 77 to the base electrode of a PNP transistor 79. This trigger turns off transistor 79 and turns on PNP transistor 81. The second positive trigger coupled through gate 18 is coupled to multivibrator 24 and, more particularly, via diode 83 to the base electrode of transistor 81. This trigger turns off transistor 81 and turns on transistor 79. The resulting negative pulse at the collector electrode of transistor 79 is coupled to a trigger former 26 which, as shown, may comprise a differentiating circuit including resistors 85 and 87 and capacitor 89.

Trigger former 26 generates a negative trigger from the leading edge of the pulse and a positive trigger from the trailing edge. Each of these triggers is coupled to multivibrator 14 and, more particularly, via diode 91 to the base electrode of PNP transistor 45. Since transistor 45 is in its "on" condition at this time, only the positive trigger will have any effect on its conductive condition. In particular, the positive trigger turns off transistor 45 at time $t_3$ and turns on transistor 41. The resulting negative voltage step at the collector electrode of transistor 45 is coupled to the base electrode of PNP transistor 37 in gate 12 to turn on transistor 37. Due to the low impedance looking into its emitter circuit at this time, transistor 37 shunts the horizontal synchronizing rate triggers supplied by source 10 from the emitter electrode through transistor 37 to the voltage supply $V_1$ (minus). Gate 12 is effectively disabled at this time $t_3$ and no triggers supplied thereafter by source 10 during the interlaced field interval will be coupled through gate 18 to multivibrator 24.

The positive output pulse developed at the collector electrode of transistor 81 in multivibrator 24 is, as was previously mentioned, coupled to utilization device 28, the sweep circuit units of the waveform monitor. The timing of this pulse with respect to the start of the interlaced field establishes which one of the 262.5 lines of television picture information in the field will be displayed by the waveform monitor. This in turn is determined by the elapsed time between enabling times $t_1$ and $t_2$, i.e., by the delay provided by the setting of movable tap of the potentiometer 57 in the variable delay signal generator 20. The more the tap is moved to the right, the greater the voltage at the tap and the longer the time for capacitor 53 to charge up to that value which will cause transistor 59 to conduct. The more the tap is moved to the left, the lower the voltage at the tap and the shorter the time for capacitor 53 to charge up to that value. Thus, the more the tap is moved to the right, the longer will be the delay inserted by signal generator 20 between enabling times $t_1$ and $t_2$ and the lower in the interlaced field will the picture information line displayed appear. Conversely, the more the tap is moved to the left, the less will be the delay between enabling times $t_1$ and $t_2$ and the higher in the interlaced field will the information line displayed appear.

It will be readily apparent that the operation described above repeats itself for subsequent television frames. The particular information line displayed, however, will always appear in the same interlaced field. By using a field shift arrangement, such as that described in applicant's pending application, Ser. No.: 441,779, filed: Mar. 22, 1965, and entitled: Non-Random Field Shift Apparatus for a Television Waveform Monitor, information lines in the alternate field can be selected for display. In this manner, a more complete analysis can be made of the operation of the television camera chain.

It will be obvious to those skilled in the art that the particular signal polarities referred to in the preceding discussions and the initial conditions assumed are illustrative only and not definitive. Whether the signals supplied by sources 10, 16, or 22 are to be positive or negative or whether any of the signals developed in the apparatus are positive going or negative going depends upon the polarities of the components selected. What is important, however, is that the timing relationships be maintained. That is, that the one-half vertical synchronizing rate triggers from gate 16 enable gate 12 and that the trailing edge of the first pulse developed by multivibrator 24 disables gate 12.

What is claimed is:

1. In line-select apparatus for a television waveform monitor:

- an output bistable multivibrator;
- first and second series connected gating means for supplying triggers to said multivibrator at the television line scanning rate;
- a control bistable multivibrator for enabling said first gating means at a time $t_1$ in response to a first periodic train of triggers supplied at one-half the television field scanning rate;
- a variable delay signal generator for enabling said second gating means at a later time $t_2$ in response to a second such periodic train of triggers; and
- means, including said control multivibrator, for disabling said first gating means at a still later time $t_3$ after two successive line scanning rate triggers cause said output multivibrator to develop a single output pulse.

2. Line-select apparatus for a television waveform monitor comprising:

- an output bistable multivibrator;
- first and second series connected gating means for supplying triggers to said multivibrator at the television line scanning rate;
- a control bistable multivibrator for enabling said first gating means at a time $t_1$ in response to a first periodic train of triggers supplied at one-half the television field scanning rate;
- a variable delay signal generator for enabling said second gating means at a later time $t_2$ in response to a second such periodic train of triggers;
- means, including said control multivibrator, for disabling said first gating means at a still later time $t_3$ after two successive line scanning rate triggers cause said output multivibrator to develop a single output pulse; and
- means for coupling said output pulse to the sweep deflection circuits of the waveform monitor to adjust the time-base system thereof to cause said monitor to display the particular line of television picture information determined by the timing of the leading edge of said output pulse with respect to the one-half field scanning rate trigger enabling said first gating means.

3. Apparatus according to claim 2 in which said disabling means includes a trigger former for generating a trigger signal from the trailing edge of the developed output pulse for switching the control multivibrator from the stable state it is in at that time to its complementary stable state.

4. Apparatus according to claim 2 in which the timing of said leading edge with respect to said one-half field scanning rate enabling trigger is determined by the delay provided by said variable signal delay generator.

5. Apparatus according to claim 4 in which said delay is provided by varying the charge time of a capacitor included within said signal generator.

6. Line-select apparatus for a television waveform monitor comprising:

- an output bistable multivibrator;
- a first gate circuit;
- means for supplying a periodic train of triggers at the television line scanning rate to an input terminal of said gate circuit;
- a second gate circuit having an input terminal connected to the output terminal of said first gate circuit and an output terminal connected to an input terminal of said output multivibrator;
- a control bistable multivibrator having an output terminal connected to a control terminal of said first gate circuit;
- means for supplying a periodic train of triggers at one-half the television field scanning rate to a first input terminal of said control multivibrator for causing said multivibrator to develop an enabling signal for said first gate circuit at time $t_1$;
- a variable delay signal generator having an output terminal connected to a control terminal of said second gate circuit;
- means for supplying a periodic train of triggers at one-half the television field scanning rate to an input terminal of said signal generator for causing said generator to develop an enabling signal for said second gate circuit at later time $t_2$;
- a trigger former circuit having an input terminal connected to an output terminal of said output multivibrator and an output terminal connected to a second input terminal of said control multivibrator for generating a trigger signal from the trailing edge of the first output pulse developed by said output multivibrator and for causing said trigger signal to switch said control multivibrator from the stable state it is in at that time to its complementary stable state at a still later time $t_3$, thereby disabling said first gate circuit at that later time; and
- means for coupling said output pulse to the sweep deflection circuits of the waveform monitor to adjust the time-base system thereof to cause said monitor to display the particular line of television picture information determined by the timing of the leading edge of said output pulse with respect to the one-half field scanning rate trigger causing said control multivibrator to enable said first gate circuit.

7. Apparatus according to claim 6 in which the duration of the developed output pulse equals the time between successive line scanning rate triggers.

8. Apparatus according to claim 6 in which said first gate circuit includes a transistor having an emitter electrode to which said periodic train of line scanning rate triggers is supplied, a base electrode to which said control multivibrator enabling and disabling signals are coupled, and a collector electrode connected to a source of unidirectional potential.

9. Apparatus according to claim 6 in which said second gate circuit includes a diode which when forward biased by said variable delay signal generator enabling signal passes line scanning rate triggers coupled to said diode from said first gate circuit.

10. Apparatus according to claim 6 in which said variable delay signal generator includes a transistor having a base electrode coupled to the movable tap of a potentiometer connected between ground and a first source of unidirectional potential, an emitter electrode coupled to one side of a capacitor, the other side of which is connected to ground, and via a resistor to a second source of unidirectional potential, and a collector electrode, wherein delay is provided by varying the voltage at said movable tap to which said capacitor must charge before said transistor will conduct and translate to its collector electrode a signal applied to its emitter electrode.

11. Apparatus according to claim 6 in which said trigger former includes a resistance-capacitance differentiating circuit.

References Cited

UNITED STATES PATENTS 2,595,646 5/1952 Doba ---------------- 178—6

ROBERT L. GRIFFIN, *Primary Examiner.*

J. A. ORSINO, *Assistant Examiner.*

U.S. Cl. X.R.

324—88; 328—187; 178—7.5